> 3,511,912
> Patented May 12, 1970

3,511,912
FUNGICIDAL COMPOSITION AND METHOD CONTAINING DIIODOPHENYL PHOSPHORANES
Daniel W. Grisley, Jr., Kirkwood, Mo., assignor to Monsanto Company, St. Louis, Mo., a corporation of Delaware
No Drawing. Filed Sept. 22, 1966, Ser. No. 581,160
Int Cl. A01n 9/36
U.S. Cl. 424—221                  4 Claims

ABSTRACT OF THE DISCLOSURE

Fungi are effectively controlled by applying diiodotriphenylphosphorane to the fungal habitat.

---

This invention relates to novel and useful compositions and to methods of controlling fungal organisms.

In accordance with this invention it has been discovered that effective fungicidal control is obtained upon the application of diiodotriphenylphosphorane to fungal organisms or to their agricultural habitat.

The diiodotriphenylphosphorane, the fungicidal agent contemplated herein, is a known chemical compound. In general it is prepared by reacting substantially molar proportions of triphenylphosphine and iodine. Typically a suitable reaction vessel is charged with about 7 parts by weight of triphenylphosphine mixed in approximately 35 parts by weight of diethylether. While stirring, about 6.5 parts by weight of iodine mixed in 45 parts by weight of benzene are slowly added to the triphenylphosphine. The reaction is carried out at room temperature at substantially atmospheric pressure. The reaction mixture is filtered and yields approximately 11 parts by weight of diiodotriphenylphosphorane, a yellow solid.

The method of controlling or combatting fungal organisms, contemplated by this invention, comprises applying diiodotriphenylphosphorane, either per se or compositions comprising same, to fungal organisms or to their environment in a lethal or toxic amount. This is done by applying diiodotriphenylphosphorane, preferably in a dispersed form, to an infested environment or to an environment the fungal organisms frequent, e.g. soil or other growth media or other media infested with the fungal organisms or attractable to the organisms for habitational or propagational purposes, in any conventional manner which permits contact between the fungal organisms and the diiodotriphenylphosphorane. Such application is brought about by using conventional means, such as power dusters, boom or hand sprayers, spray dusters, drills, spreaders and the like.

The following example illustrates the fungicidal activity of diiodotriphenylphosphorane.

An intimate mixture of one volume of yellow cornmeal and three volumes of white sand is infested with a particular pathogen (below itemized) and incubated for two weeks at 20° C. Then one volume of this infested mixture is blended uniformly with three volumes of sterilized top soil. To accomplish complete blending the composite of soil and infested mixture is passed through a No. 8 U.S. mesh screen three times. A number of small cups are tightly packed with 30 gram portions of the composite and the surface thereof leveled. Diiodotriphenylphosphorane is dissolved in sufficient acetone to make a 1% by weight solution and then diluted with water to provide a formulation having a concentration of 0.1% by weight. To provide solutions of the desired concentration for application to the aforedescribed composite, the following further dilutions with water are made:

| Conc. desired in infested soil | Ml. of 0.1% formulation | Ml. of water added to formulation |
|---|---|---|
| 30 p.p.m | 1 | 3 |
| 40 p.p.m | 1.4 | 2.6 |

The four milliliter portions are poured over the surface of the infested soil in each cup, care being taken to insure even distribution. The cups are then placed in a 100% humidity chamber at approximately 70° F. for about 44 hours. Upon removal from the chamber the amount of mycelial growth on the surface of the infested soil is noted and rated as follows:

1=no growth
2=growth from cornmeal only
3=some growth away from cornmeal particles
4=surface covered, but little area growth
5=growth equivalent to that of untreated soil.

The aforedescribed procedure is conducted with a composite infested with *Pythium ultimum* and a composite infested with *Rhizoctonia solani*.

The effectiveness of diiodotriphenylphosphorane in controlling these soil borne fungi is illustrated by the following.

At a concentration of 30 p.p.m. a rating of 1 is obtained for controlling the growth of *Pythium ultimum* and a rating of 2 is obtained for controlling the growth of *Rhizoctonia solani*. At a concentration of 40 p.p.m. the control of *Rhizoctonia solani* is improved to a rating of 1.

The example below further demonstrates the effectiveness of diiodotriphenylphosphorane for controlling plant pathogenic fungi.

A culture of a soil pathogen is blended into ordinary field soil to obtain a predominance of that particular fungal organism. This fortified soil is then put into suitable flat containers, seeded and treated with the chemical to be evaluated. The containers are placed in a greenhouse and watered to insure good growing conditions. Two weeks later the treatments are evaluated as to the amount of disease control and phytotoxicity of the chemical to the seeded plants. Containers containing soil infested with *Pythium ultimum* are seeded with cucumber seeds (Straight Eight). Containers containing soil infested with *Rhizoctonia solani* are seeded with cotton (Delta Pine No. 15). Each container is treated by incorporating in the soil a sufficient amount of diiodotriphenylphosphorane, diluted in an inert carrier, to give application rates of six and three pounds per acre. The results set out below are the average of three replicates at each rate of application and show the effectiveness of diiodotriphenylphosphorane for controlling fungal organisms.

| Application rate | 6 lbs./a. | 3 lbs./a |
|---|---|---|
| Percent control *P. ultimum* | 90 | 80 |
| Percent control *R. solani* | 23 | 20 |
| Phytotoxicity to cucumber | None | None |
| Phytotoxicity to cotton | None | None |

In this specification and appended claims the term "dispersed" is used in its widest possible sense. When it is said that the diiodotriphenylphosphorane, the fungicidal agent of this invention, is dispersed, it means that the particles of the fungicidal agent can be molecular in size and held in true solution in a suitable organic solvent. It means further, that the particles can be colloidal in size or larger and distributed throughout a liquid phase in the form of suspensions or emulsions or in the form of particles held in suspension by surfactants. It also includes particles that are dispersed in semisolid, viscous carriers such as petrolatum, soap or an ointment base in which they can be actually dissolved in the semisolid or held in suspension in the semisolid with the aid of suitable surfactants. The term "dispersed" also means that the particles can be mixed with and distributed throughout a solid carrier providing a mixture in particulate form, e.g. pellets, granules, powders, or dusts. The term "dispersed" also includes mixtures which are suitable for use as aerosols including solutions, suspensions, or emulsions of the fungicidal agent of this invention in a carrier such as dichlorodifluoromethane or other inert propellants.

For the sake of brevity and simplicity, the term "fungicidal agent" as used herein means diiodotriphenylphosphorane. In practicing the fungicidal methods of this invention the fungicidal agent is used alone or in combination with materials referred to in the art as fungicidal adjuvants in liquid or solid form. The fungicidal compositions of this invention are prepared by admixing the fungicidal agent with one or more fungicidal adjuvants which include diluents, extenders, carriers, propellants, adhesives, humectants and surfactants, to provide compositions in the form of finely-divided particulate solids, granules, pellets, suspensions, dispersions, emulsions, solutions or aerosols. Thus the fungicidal agent can be used with a fungicidal adjuvant such as a finely-divided particulate solid, a liquid of organic origin, water, a wetting agent, a dispersing agent or emulsifying agent or any suitable combination of these.

Typical finely-divided solid adjuvants which can be used in the fungicidal compositions of this invention include for example the natural or treated, clays, talcs, carbonates, pumice, silica, diatomaceous earth, silicates, quartz, fuller's earth, ground sea shells, charcoal, tricalcium phosphate, bole, kieselguhr, sulfur, powdered cork, powdered wood, ground nut shells, tobacco dust and the like. Typical liquid adjuvants include for example, acetone, methyl ethyl ketone, isopropyl ether, dioxane, cyclohexanone, carbon tetrachloride, ethylene dichloride, tetrachloroethane, hexane, heptane, hydrogenerated naphthalenes, naphtha, benzene, glycols, alcohols and the like.

The fungicidal compositions of this invention particularly liquids and wettable particles, usually contain one or more surfactants in amounts sufficient to render a given composition readily dispersible in water or oil. By the term "surfactant" it is understood that wetting agents, dispersing agents, suspending agents, spreading agents, and emulsifying agents are included therein. Thus the term surfactant includes those agents known in the art as "emulsifying agents" as used in vol. II of Schwartz, Perry and Berch's "Surface Active Agents and Detergents" (1958, Interscience Publications, Inc., New York, N.Y.) to connote generically the various agents that are adapted to be admixed with the fungicidal agent to promote better wetting, dispersing and spreading of the fungicidal agent in a liquid vehicle or carrier by modifying the surface tension of the vehicle (see also Frear "Chemistry of Insecticides and Herbicides," second edition, page 280). The surfactants include the anionic, cationic and non-ionic types which are described in detail in vols. I and II of Schwartz, Perry and Berch's "Surface Active Agents and Detergents" (1958, Interscience Publishers, Inc., New York). The disclosure of these publications with respect to surfactants are incorporated in this specification by reference.

The term "fungicidal compositions" as used herein includes not only compositions in suitable form for application but also concentrated compositions which require dilution or extension with a suitable quantity of a liquid or solid adjuvant prior to application.

The exact concentration of the fungicidal agent in the fungicidal compositions of this invention employed in combating or controlling fungal organisms can vary from 0.001 to 99.9% provided the required dosage (i.e. toxic or lethal amount) thereof is applied to the fungal organisms or to their environment. When the adjuvant is a liquid or mixture of liquids (e.g. as in solutions, suspensions, emulsions, or aerosols), the concentration of the fungicidal agent employed to supply the desired dosage generally is in the range of about 0.001 to 50 percent by weight base on the total weight of the fungicidal composition. When the adjuvant is a semisolid or solid, the concentration of the fungicidal agent employed to supply the desired dosage generally is in range of about 0.1 to 25 percent by weight based on the weight of the total composition.

When the fungicidal agent is to be applied to the fungal organisms or to their environment as aerosols, it is convenient to mix it in a suitable liquid adjuvant and disperse the resulting mixture in dichlorodifluoromethane or other suitable inert propellants.

In controlling or combating fungal organisms by the method of this invention it is preferable to use compositions containing a fungicidally effective amount of diiodotriphenylphosphorane and a fungicidal adjuvant in the form of emulsions or suspensions. Emulsions or suspensions are prepared by dispersing the fungicidal agent either per se or in the form of an organic solution thereof in water with the aid of surfactants. In general it is preferred that a mixture of anionic and non-ionic surfactants be employed. Of the non-ionic surfactants, particularly preferred are the water soluble polyoxyethylene derivatives of alkyl phenols (particularly isooctylphenol) and the water soluble polyoxyethylene derivatives of the mono-higher fatty acid esters of hexitol anhydrides such as mannitan or sorbitan. Particularly preferred anionic surfactants are the water soluble alkali metal alkylaryl sulfonates as exemplified by sodium decylbenzene sulfonate and sodium dodecylbenzene sulfonate. The amount of surfactants employed is generally 0.1 to 15% by weight based on the weight of the fungicidal composition.

Other forms of the fungicidal compositions of this invention are prepared by dispersing the diiodotriphenylphosphorane in solid, particulate adjuvants by suitable methods such as tumbling, grinding, or other conventional means. The solid adjuvant may be of either an organic or inorganic nature. The preferred solid adjuvants are the absorbant clays, e.g. bentonite. These mixtures are used for fungicidal purposes in the dry form, or, by the addition of surfactants can be rendered wettable by water so as to obtain a substantially stable aqueous dispersion or suspension suitable for use as sprays.

The fungicidal compositions of this invention can also be advantageously employed in combination with fertilizers and pesticides including for example, insecticides, bactericides, nematocides, and herbicides. In this manner it is possible to obtain mixtures which provided a broader effect with each application.

The embodiments of the invention in which an exclusive property or privilege is claimed are defined as follows:

1. A method of controlling fungi selected from the group consisting of *Pythium ultimum* and *Rhizoctonia solani* which comprises applying to the fungal habitat a fungicidally toxic amount of diiodotriphenylphosphorane.

2. A method in accordance with claim 1 wherein the diiodotriphenylphosphorane is applied to soil infested with fungi.

3. A fungicidal composition which comprises a fungicidally toxic amount of diiodotriphenylphosphorane and a finely-divided solid.

4. A fungicidal composition in accordance with claim 3 wherein the composition contains from about 0.1 to about 25 percent by weight of diiodotriphenylphosphorane.

References Cited

UNITED STATES PATENTS 2,904,588  9/1959  Smith _____ 260—543
3,172,803  3/1965  Birum _____ 167—30

OTHER REFERENCES

Chem. Abstracts, 1957, vol. 51, pp. 6419–6420.

ALBERT T. MEYERS, Primary Examiner

D. R. ORE, Assistant Examiner

U.S. Cl. X.R.

424—45, 357, 358